US009690039B2

(12) United States Patent
Chaen

(10) Patent No.: US 9,690,039 B2
(45) Date of Patent: Jun. 27, 2017

(54) LIGHT SOURCE DEVICE AND DISPLAY DEVICE

(75) Inventor: Katsuya Chaen, Kyoto (JP)

(73) Assignee: Kyocera Corporation, Kyoto-shi (JP)

( * ) Notice: Subject to any disclaimer, the term of this patent is extended or adjusted under 35 U.S.C. 154(b) by 826 days.

(21) Appl. No.: 13/992,585

(22) PCT Filed: Dec. 8, 2011

(86) PCT No.: PCT/JP2011/078396
§ 371 (c)(1),
(2), (4) Date: Jun. 7, 2013

(87) PCT Pub. No.: WO2012/077746
PCT Pub. Date: Jun. 14, 2012

(65) Prior Publication Data
US 2013/0250615 A1    Sep. 26, 2013

(30) Foreign Application Priority Data

Dec. 10, 2010  (JP) ................................ 2010-275669

(51) Int. Cl.
*F21V 8/00* (2006.01)
*G02F 1/1335* (2006.01)

(52) U.S. Cl.
CPC ..... *G02B 6/0083* (2013.01); *G02F 1/133615* (2013.01); *G02F 1/133603* (2013.01); *G02F 2001/133612* (2013.01)

(58) Field of Classification Search
CPC .. G02B 6/0083; G02B 6/0088; G02B 6/0068; G02B 6/0073; G02B 6/0091; G02B 6/0038; G02B 6/0021; G02B 6/0028; G02B 6/0046; G02B 6/0001; G02B 6/0023; G02B 6/009; G02F 1/133615; G02F 1/133603; G02F 2001/133612; G02F 1/133308; G02F 2001/133314; G02F 1/136286; G02F 2001/13629; G02F 2201/46; G02F 1/1336; G02F 2001/33612; F21S 4/00; F21V 13/12; F21V 23/06; F21V 25/00; H05K 5/0017; G09F 13/18; F21Y 2101/02; G04C 3/008; H01L 2224/48247; H04N 5/645
(Continued)

(56) References Cited

U.S. PATENT DOCUMENTS 9,182,536 B2 * 11/2015 Chaen ................. G02B 6/0083
2008/0002092 A1 * 1/2008 Park .................... G02B 6/0083
                                                               349/58
(Continued)

FOREIGN PATENT DOCUMENTS

JP    2002-133933 A    5/2002
JP    2002-268573 A    9/2002
(Continued)

OTHER PUBLICATIONS

Japanese Office Action with English Concise Explanation, Japanese Patent Appln. No. 2012-547905, Apr. 30, 2014, 5 pp.

*Primary Examiner* — Stephen F Husar
(74) *Attorney, Agent, or Firm* — Volpe and Koenig, P.C.

(57) ABSTRACT

A light source device 11 has a light emitting element 23, a light guide plate 15 which light from the light emitting element 23 enters, and wiring 17 for supplying power to the light source. The light guide plate has a guide part 31 for positioning the wiring 17.

15 Claims, 11 Drawing Sheets

(58) Field of Classification Search
USPC ......... 349/58, 65, 149; 362/97.1, 97.2, 97.3,
362/615, 621, 623, 625, 630, 634, 23.16;
29/428; 345/102; 385/132; 445/23;
968/452
See application file for complete search history.

(56) References Cited

U.S. PATENT DOCUMENTS

2011/0007239 A1   1/2011  Hamada
2011/0032724 A1*  2/2011  Kinoshita ..................... 362/552
2011/0199558 A1   8/2011  Hamada

FOREIGN PATENT DOCUMENTS

| JP | 2007-123133 A | 5/2007 |
|----|---------------|--------|
| JP | 2009199871 A | 9/2009 |
| WO | 2009/118941 A1 | 10/2009 |
| WO | 2010/084644 A1 | 7/2010 |

* cited by examiner

LIGHT SOURCE DEVICE AND DISPLAY DEVICE

TECHNICAL FIELD

The present invention relates to a light source device and a display device which has the light source device

BACKGROUND ART

There is known a light source device having a point or linear light source and a light guide plate for converting light from the light source to planar light (for example Patent Literature 1). Such a light source device is for example being used in a display device such as a liquid crystal display device. To the light source, wiring for supplying power to the light source is connected. The wiring is suitably laid and for example extends to the outside of the light source device or display device.

PRIOR ART DOCUMENTS

Patent Literature

Patent Literature 1: Japanese Patent Publication No. 2002-133933A

SUMMARY OF INVENTION

Technical Problem

The wiring which is connected to the light source is preferably arranged at the outside of a light guide plate for the purpose of reducing the influence of the wiring upon the luminance, chromaticity, etc. or of reducing the thickness of the light source device. On the other hand, when the wiring is arranged at the outside of the light guide plate, for example, in the middle of assembly of the light source device or display device, the wiring easily projects to the outside of the member which becomes the housing, so the work efficiency in assembly is lowered. Further, for example, the clearance between the light guide plate and the members around it (for example the housing) tends to become narrower along with the reduction of size of devices. As a result, the probability of the wiring receiving stress from the peripheral members becomes higher. In this way, the wiring which supplies power to the light source is difficult to suitably arrange due to existence of the light guide plate which guides light from the light source.

Accordingly, it has been desired to provide a light source device which enables wiring to be suitably arranged with respect to a light guide plate and a display device which has the light source device.

Solution to Problem

A light source device according to an aspect of the present invention has a light source, a light guide plate which light from the light source enters, and wiring for supplying power to the light source, wherein the light guide plate has a guide part for positioning the wiring.

A display device according to an aspect of the present invention has a light source, a light guide plate which light from the light source enters, a display panel to which the light which is guided by the light guide plate is irradiated, and wiring for supplying power to the light source, wherein the light guide plate has a guide part for positioning the wiring.

Advantageous Effects of Invention

According to the above configuration, wiring can be suitably arranged with respect to a light guide plate.

DESCRIPTION OF EMBODIMENTS

An embodiment of the present invention will be explained below with reference to the drawings. Note that, the notations include the same notations with additional notations of capital letters attached for parts of the same or similar configurations such as "first light source unit 13A, second light source unit 13B". Further, in this case, the number of the head of the name and the above additional notation will be sometimes omitted such as the "light source unit 13".

Figure 1:
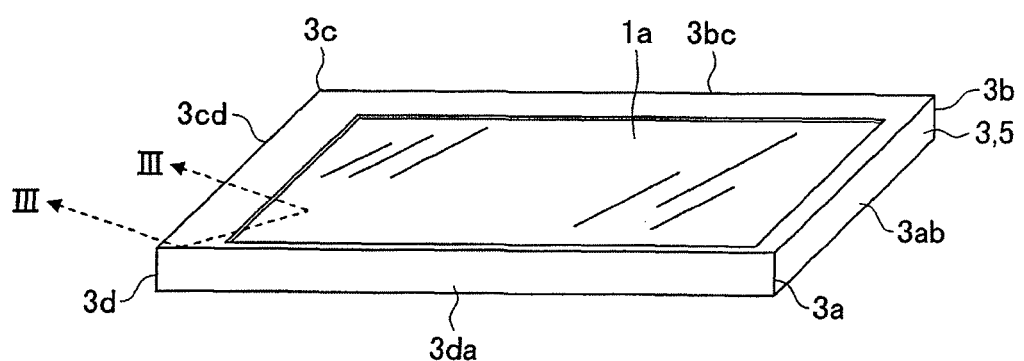
FIG. 1 A perspective view of an appearance of a display device according to an embodiment of the present invention.

FIG. 1 is a perspective view of an appearance of a display device 1 according to an embodiment of the present invention.

The display device 1 is configured by for example a liquid crystal display device which is capable of displaying an image on a display screen 1a. The display device 1 has a housing 3. The housing 3 is for example formed in a substantially thin rectangular parallelepiped shape. It has a first corner 3a, second corner 3b, third corner 3c, and fourth corner 3d and has a first side surface 3ab, second side surface 3bc, third side surface 3cd, and fourth side surface 3da between these corners. The display screen 1a is provided on one major surface of the housing 3. The display screen 1a for example has a roughly similar shape (rectangle in the present embodiment) as the major surface of the housing 3, but is provided at the major surface of the housing 3 offset toward the first corner 3a side.

Figure 2:
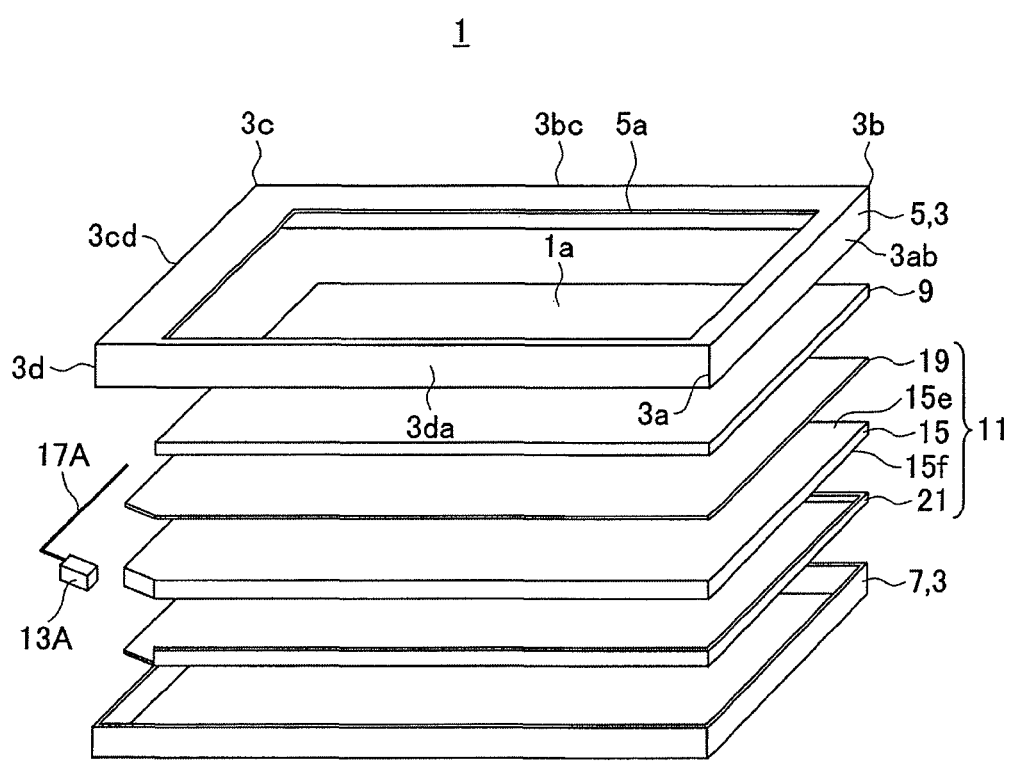
FIG. 2 A schematic disassembled perspective view of the display device of FIG. 1.

FIG. 2 is a schematic disassembled perspective view of the display device 1.

The display device 1 has a face board 5 and a back board 7 which configure the housing 3. Further, the display device 1 has, inside the housing 3, a display panel 9 and a light source device 11 as the back light which illuminates the display panel 9.

The back board 7 is formed in for example a box shape which is capable of accommodating the light source device 11 and the display panel 9. The face board 5 is formed in for example a box shape which is one size larger than the back board 7, is placed over the back board 7 which accommodates the light source device 11 and display panel 9, closes the opening of the back board 7, and surrounds the outer periphery of the back board 7. In the face board 5, a display window 5a is opened for exposure of the display panel 9. The display window 5a is provided at the face board 5 offset toward the first corner 3a side.

The face board 5 and back board 7 are formed by for example metal. More specifically, for example, the face board 5 and back board 7 are configured by press working sheet metal. Note, the face board 5 and back board 7 may be formed by plastic as well. The face board 5 and back board 7, while not particularly shown, are fixed to each other by engagement parts, screws, solder, and/or a binder.

The display panel 9 is configured by a so-called "liquid crystal display panel". That is, the display panel 9 has two transparent substrates which are arranged facing each other and have a clearance between them in which a liquid crystal is sealed (liquid crystal display panel 9a in the narrow sense (see FIG. 3)) and polarizing plates 9b laminated on their two surfaces. Although not particularly shown, pixel electrodes, common electrodes, color filters (in the narrow sense), etc. are laminated on the two transparent substrates.

The display panel 9 is formed for example in a rectangular shape one size larger than the display window 5a. The display panel 9 is arranged offset toward the first corner 3a side with respect to the major surface of the housing 3 in the same way as the display window 5a and closes the display window 5a from the inside. The display screen 1a is configured by a portion which is exposed from the display window 5a of the display panel 9.

Although not particularly shown, the display panel 9 is connected to a flexible board (for example TAB tape), while the flexible board is connected to a circuit board. On the circuit board, an IC for converting display information to a display signal is mounted. On the flexible board, a driver IC is mounted for supplying voltage between the pixel electrodes and the common electrodes for each pixel based on the display signal from the IC. These flexible board and circuit board are arranged on the second side surface 3bc side and third side surface 3cd side of the housing 3 with respect to the display panel 9. Note that, the driver IC etc. may be mounted on the display panel 9 by a COG technique as well.

The light source device 11 has a first light source unit 13A and second light source unit 13B (see FIG. 4) which generate light, a light guide plate 15 for guiding the light which is generated by the light source units 13, and first wiring 17A and second wiring 17B (see FIG. 4) for supplying power to the light source units 13. Further, the light source device 11 has an optical sheet 19 and reflecting plate 21 for more efficiently utilizing the light which is guided by the light guide plate 15.

The light guide plate 15 is formed in for example a substantially rectangular flat plate shape and has a first major surface 15e and second major surface 15f. Further, the light guide plate 15 is formed by for example a light transmitting acrylic plate. On the second major surface 15f, for example, provision is made of a not shown dot pattern (plurality of projecting portions) which is formed integrally with the light guide plate 15 or formed by a member different from the light guide plate 15.

The light source units 13 are configured as point light sources. The light source units 13 are arranged to face a side surface (including corners) of the light guide plate 15. More specifically, for example, the corners of the light guide plate 15 are chamfered, and the light source units 13 face the chamfered surfaces.

The light which is generated at the light source units 13 enters the light guide plate 15 from the above-described chamfered surfaces (side surface of the light guide plate 15). The light which enters the side surface of the light guide plate 15 is totally reflected at the first major surface 15e and second major surface 15f while being guided along these major surfaces. The guided light is scattered by the dot pattern and exits from the first major surface 15e. In this way, the light generated in the light source units 13 is converted to planar light.

The optical sheet 19 is configured by for example laminating two prism sheets in which fine relief shapes are formed and is laminated on the first major surface 15e. The prism sheets are formed by for example a resin such as a polyester or polycarbonate. The light which is emitted from the first major surface 15e is given directivity when passing through the optical sheet 19. Due to this, the luminance of the light source device 11 is improved.

The reflecting plate 21 is formed in for example a box shape (however, not having a side surface on the third side surface 3cd side) which is capable of accommodating the light guide plate 15 and covers the second major surface 15f and side surfaces of the light guide plate 15. The reflecting plate 21 is formed by for example a metal, a resin which is coated by a metal, or a plastic which contains a scattering agent etc. The light which is leaked from the second major surface 15f or side surface of the light guide plate 15 is reflected at the reflecting plate 21 and enters the light guide plate 15 again. Due to this, the luminance of the light source device 11 is improved.

The light guide plate 15 substantially fits in the reflecting plate 21. Further, the reflecting plate 21 which accommodates the light guide plate 15 substantially fits in the back board 7 (housing 3) (see FIG. 4 too). Note that, the light guide plate 15 or reflecting plate 21 may indirectly abut against the inner side surfaces of the housing 3 through suitable members. Further, the light guide plate 15, optical sheet 19, and reflecting plate 21 may be fixed to each other by suitable means such as a binder.

Figure 3:
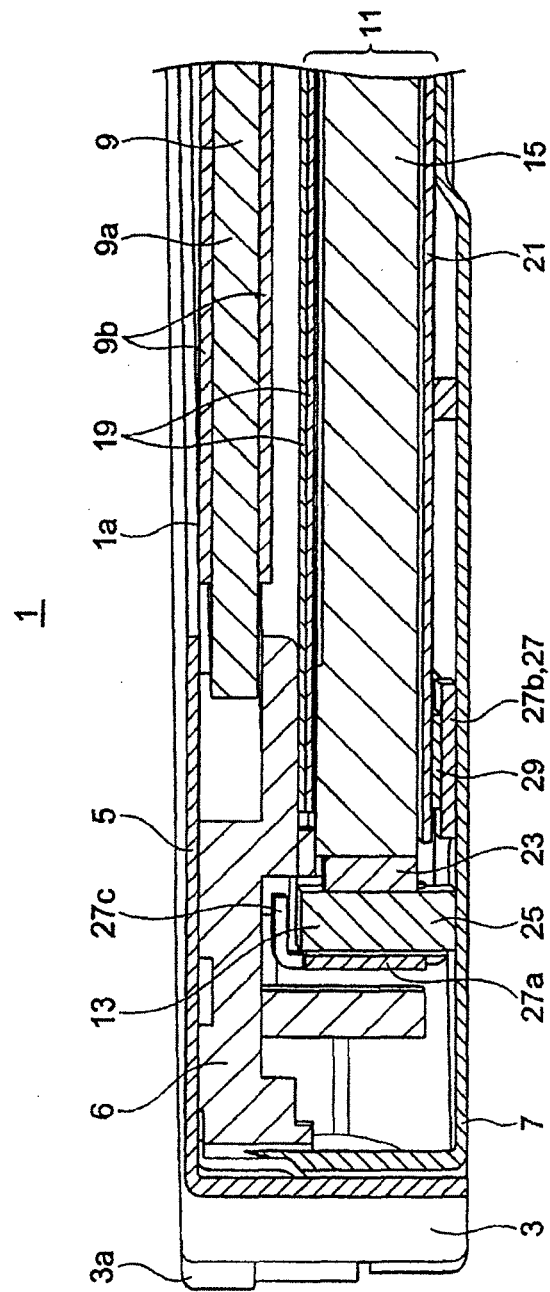
FIG. 3 A cross-sectional view taken along the line III-III of FIG. 1.

FIG. 3 is a cross-sectional view taken along the line III-III of FIG. 1.

As explained above, the housing 3 has the face board 5 and back board 7. Further, in the housing 3, from the display screen 1a side, the display panel 9, optical sheet 19, light guide plate 15, and reflecting plate 21 are laminated in that order. The light source units 13 are arranged to face the side surface of the light guide plate 15.

Note that, in the internal portion of the housing 3, provision is also made of a holding member 6 which fits in the clearance between the light source device 11, display panel 9, and other members and the housing 3 and contributes to positioning of the members with respect to the housing 3.

Figure 4:
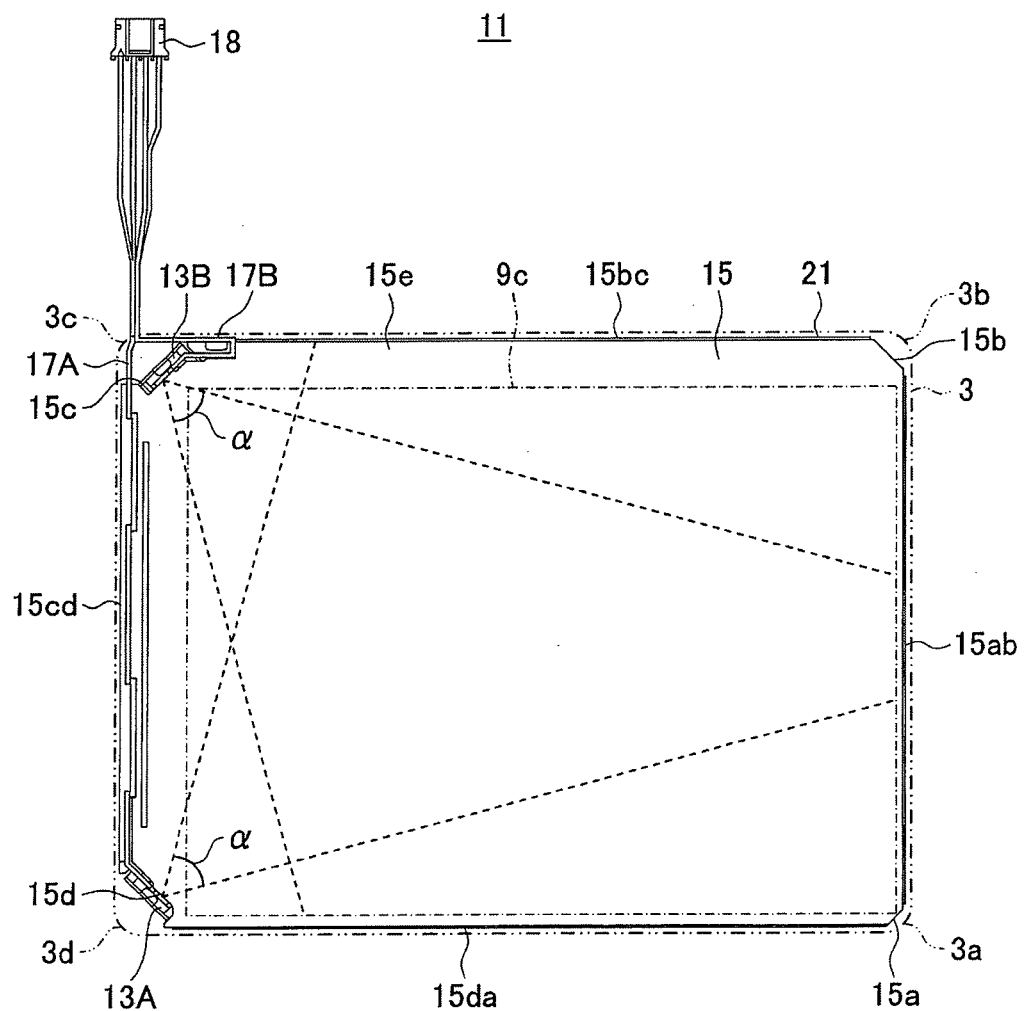
FIG. 4 A plan view of a light source device of the display device of FIG. 1.

FIG. 4 is a plan view of the light source device 11. Note, illustration of the optical sheet 19 is omitted. Further, the inner side surfaces of the housing 3 (back board 7) are indicated by a two-dotted chain line. Note that, the housing 3 (back board 7) may be grasped as a portion of the light source device 11 as well.

The light guide plate 15 is, as explained above, formed to a substantially rectangular shape, has a first corner 15a to fourth corner 15d which correspond to the first corner 3a to fourth corner 3d of the housing 3, and has a first side surface 15ab, second side surface 15bc, third side surface 15cd, and fourth side surface 15da between these corners.

A display region 9c (indicated by a one-dotted chain line) for displaying images of the display panel 9 or display window 5a (FIG. 2) of the housing 3 is arranged offset toward the first corner 15a side with respect to the first major surface 15e of the light guide plate 15. In other words, in the light guide plate 15, the outside area of the display region 9c becomes broader on the second side surface 15bc and third side surface 15cd sides than the first side surface 15ab and fourth side surface 15da sides. Accordingly, the second side surface 15bc and third side surface 15cd become portions in which the influence of reflection etc. exerted upon the luminance of the display region 9c is relatively lower compared with the first side surface 15ab and fourth side surface 15da. Note that, the display region 9c is defined by for example a range of arrangement of pixels (pixel electrode).

The two light source units 13 are arranged to face corners at the two ends of one side of the light guide plate 15. Specifically, for example, the light source units 13 face the third corner 15c and fourth corner 15d at the two ends of the shorter side (third side surface 15cd) on the side where the outside area of the display region 9c is relatively large in the light guide plate 15.

The light source unit 13 irradiates light by a predetermined irradiation angle α in a generally diagonal direction of the light guide plate as the irradiation direction. In the irradiation angle α, for example, a range of 50% of relative light intensity is defined as the irradiation angle. The magnitude thereof is for example 60 degrees.

The light which is generated by the light source unit 13 is uniformly taken out from the first major surface 15e by being guided, reflected and scattered by the light guide plate 15 etc. However, it is hard for the light to reach a region which is not contained within the range of the irradiation angle α (non-irradiation region) in the side surface of the light guide plate 15. Accordingly, the entire third side surface 15cd, the third corner 15c side portion in the second side surface 15bc, and the fourth corner 15d side portion in the fourth side surface 15da become portions in which the influence exerted upon the luminance of the display region 9c is relatively low compared with the other portions in the side surface of the light guide plate 15.

The first wiring 17A is for supplying power to the first light source unit 13A. The first wiring 17A extends from the first light source unit 13A (fourth corner 15d) along the third side surface 15cd up to the third corner 15c and further extends to the outside of the housing 3 from a not shown hole formed around the third corner 3c of the housing 3. Accordingly, the first wiring 17A is provided along the side surface having a relatively large distance from the display region 9c and is provided in a non-irradiation region of the light source unit 13.

The second wiring 17B is for supplying power to the second light source unit 13B. The second wiring 17B is arranged at a portion of the second side surface 15bc on the third corner 15c side. Then, it merges with the first wiring 17C and extends to the outside of the housing 3 from a not shown hole formed around the third corner 3c of the housing 3. Accordingly, the second wiring 17B is provided along a side surface having a relatively large distance from the display region 9c and is provided in a non-irradiation region of the light source unit 13.

At the tips of the plurality of wirings 17, a connector 18 is provided for connecting the plurality of wirings 17 to another apparatus. Note that, the plurality of wirings 17 may be bundled by a suitable member or the insulation films of the wirings 17 may be bonded to each other at the point where the first wiring 17A and second wiring 17B merge or at a suitable position and/or in a suitable range from the above point where they merge up to the connector 18.

Figure 5:
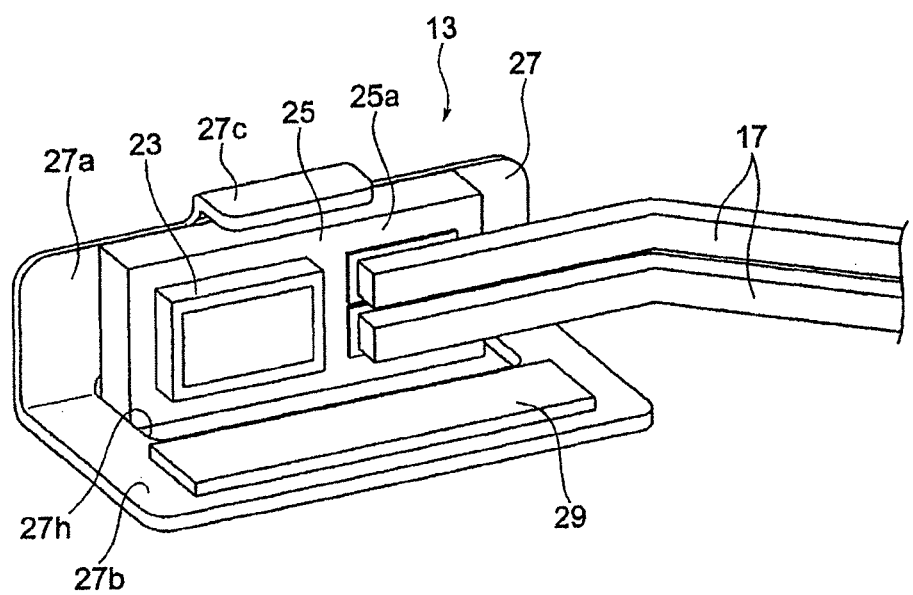
FIG. 5 A perspective view of a light source unit of the light source device of FIG. 4.

FIG. 5 is a perspective view of a light source unit 13. Note that, part of the members such as the wirings 17 are schematically shown.

The light source unit 13 has a light emitting element 23 as the point light source, a substrate 25 on which the light emitting element 23 is mounted, and a heat dissipating plate 27 which holds the substrate 25.

The light emitting element 23 is configured by for example an LED, more specifically is configured by a chip LED substantially rectangular parallelepiped.

The wiring 17 is for example formed by covering one or more metal wires by an insulation film. Two wirings 17 are provided for one light source unit 13 corresponding to positive/negative potentials. Note that, the cross-sectional shape of the wiring 17 is generally circular, but is shown by a rectangle since FIG. 5 is a schematic diagram. Further, the coating films of the two wirings 17 may be bonded to each other. The coating films may be given a suitable color. However, preferably a white color is given so as to contribute to improvement of the luminance of the light guide plate 15, but so as to not exert any influence upon the chromaticity.

The substrate 25 is configured by a rigid type circuit board using hard resin or ceramic as the base or a flexible printed circuit board using a copper clad laminated board on one surface or two surfaces of a polyester film or polyimide film and has a mount surface 25a on one major surface. The substrate 25 is formed to for example a rectangle.

On the mount surface 25a, the light emitting element 23 is surface-mounted by solder, while the wirings 17 are connected by solder. The light emitting element 23 and the wirings 17 are electrically connected through a not shown wiring pattern of the substrate 25. The light emitting element 23 is mounted on for example one side of a longitudinal direction of the mount surface 25a, while the wirings 17 are connected to the other side of the longitudinal direction of the mount surface 25a and extend to the other side.

The heat dissipating plate 27 is for example formed by press working one sheet metal. The heat dissipating plate 27 has a back surface portion 27a which faces the back surface of the mount surface 25a of the substrate 25, an extending portion 27b which is perpendicular to the back surface portion 27a, and a projection portion 27c which projects at the opposite side to the extending portion 27b of the back surface portion 27a, and faces the extending portion 27b. In the extending portion 27b, a hole 27h is formed as an empty space.

The substrate 25 is fixed to the heat dissipating plate 27 by for example using solder, a binder, or double sided tape to bond the back surface of the mount surface 25a to the back surface portion 27a. Note that, the material or member bonding the substrate 25 and heat dissipating plate 27 preferably has a high thermal conductivity.

The projection portion 27c can abut against one side surface the substrate 25 and contributes to restriction of movement of the substrate 25. The restriction direction is for example a lateral direction of the substrate 25, a direction which is perpendicular to the arrangement direction of the mount regions of the light emitting element 23 and wirings 17, and a direction which is perpendicular to the direction of extension of the wirings 17.

Further, the substrate 25 is restricted in movement in the diametrical direction of the hole 27h with respect to the heat dissipating plate 27 by having one side surface portion accommodated and preferably fit in the hole 27h. The restriction direction is for example a longitudinal direction of the substrate 25, an arrangement direction of the mount regions of the light emitting element 23 and wirings 17, a direction of extension of the wirings 17, and a direction which is perpendicular to the restriction direction of the projection portion 27c.

Note that, the side surface of the substrate 25 which is accommodated in the hole 27h (the side surface which faces downward in the sheet surface of FIG. 5) preferably becomes the same plane as the surface of the extension portion 27b which is at the opposite side to the back surface portion 27a (the surface which faces downward in the sheet surface of FIG. 5).

Double sided tape 29 is arranged on the surface of the extending portion 27b on the back surface portion 27a side. More specifically, the double sided tape 29 is arranged on the side of the tip end of the extending portion 27b other than the hole 27h. Further, as shown in FIG. 3, the double sided tape 29 is bonded to the back surface of the reflecting plate 21 (the surface opposite to the light guide plate 15) whereby the heat dissipating plate 27 is fixed to the reflecting plate 21 and light guide plate 15. Note that, a binder or solder may be used in place of the double sided tape 29.

As shown in FIG. 3, the extending portion 27b abuts against the inner side surface of the back board 7. Further, the portion of the substrate 25 accommodated in the hole 27h abuts against the inner side surface of the back board 7 as well. Due to this, heat of the substrate 25 is indirectly through the heat dissipating plate 27 or directly transmitted to the back board 7.

Figure 6:
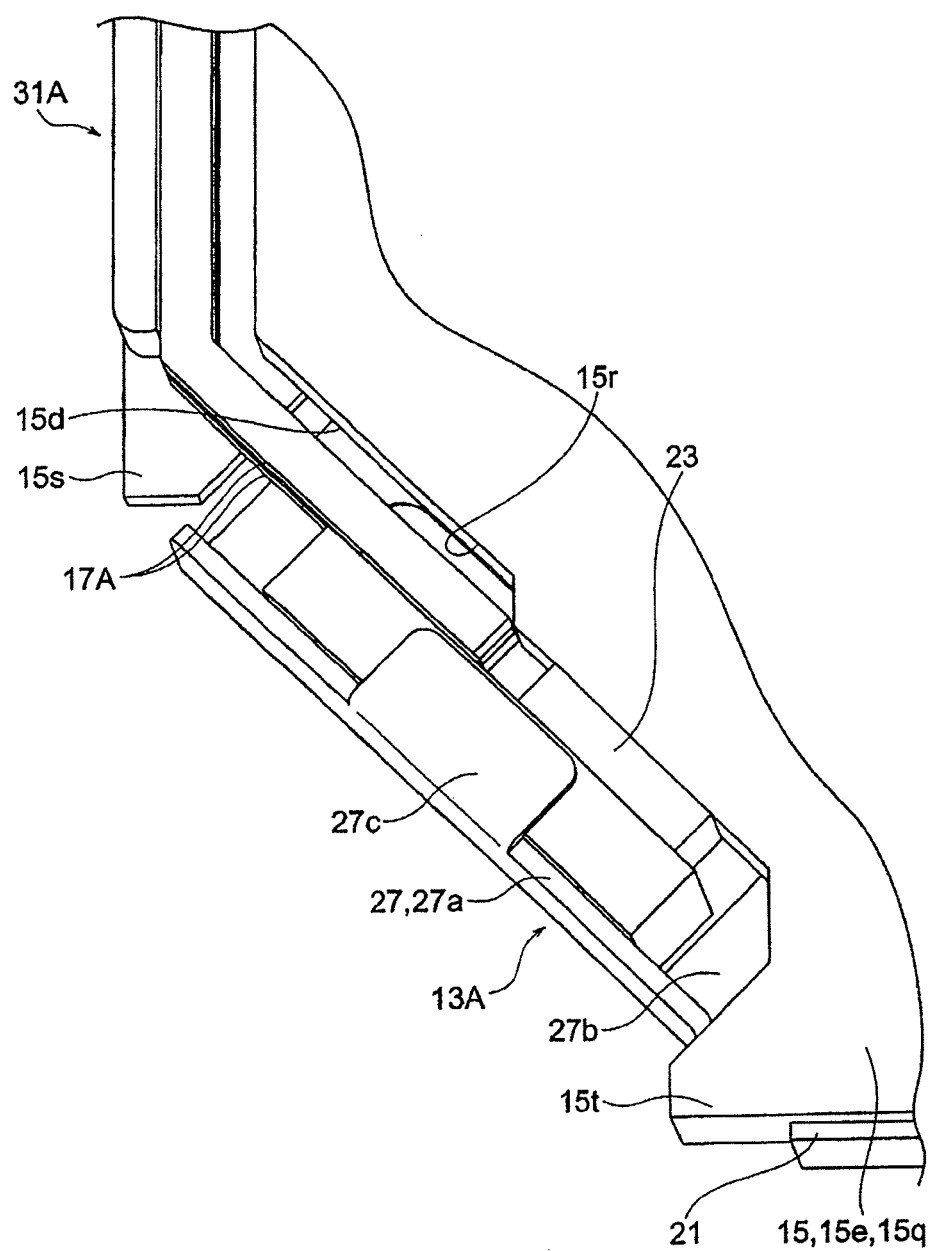
FIG. 6 A perspective view which shows the periphery of one light source unit.

FIG. 6 is a perspective view which shows the periphery of the first light source unit 13A.

When viewed by a plane, a cut-away portion is formed in the fourth corner 15d (chamfered surface) of the light guide plate 15. The first light source unit 13A is arranged so as to be accommodated in this cut-away portion and is restricted in movement with respect to the light guide plate 15. In other words, the light guide plate 15 has a light guide plate body 15q which includes a facing surface 15r which the first light source unit 13A faces in its side surface, and a stopper 15s and positioning portion 15t which project from the light guide plate body 15q and restrict the movement of the first light source unit 13A.

The stopper 15s is located on the arrangement side of the first wiring 17A with respect to the first light source unit 13A (or light emitting element 23) and restricts movement of the first light source 13A (or light emitting element 23) to the arrangement side of the first wiring 17A. More specifically, the stopper 15s is formed so as to project to the back surface side (the side of the inmost part of the sheet surface of FIG. 6) of the light guide plate body 15q as well, and the edge of the extending portion 27b of the heat dissipating plate 27 abuts against the stopper 15s.

The positioning portion 15t is located on the opposite side to the arrangement side of the first wiring 17A with respect to the first light source unit 13A (or light emitting element 23) and restricts movement of the first light source 13A (or light emitting element 23) to the opposite side to the arrangement side of the first wiring 17A. More specifically, the positioning portion 15t is formed with a thickness equivalent to that of the light guide plate body 15q, and the edge of the back surface portion 27a of the heat dissipating plate 27 abuts against the positioning portion 15t.

The stopper 15s and positioning portion 15t are formed integrally with the light guide plate body 15q for example by forming shapes corresponding to the stopper 15s and positioning portion 15t in the mold for injection molding the light guide plate 15.

Note that, the light source unit 13, stopper 15s, and positioning portion 15t are contained in a rectangle when assuming that the light guide plate 15 is not provided with chamfered surfaces and the cut-away portion. As shown in FIG. 4, they are contained in the rectangular housing 3 in which the light guide plate 15 substantially fits.

Further, in the facing surface 15r, a step is formed in order to suppress interference between the wirings 17 and the light guide plate 15 while making the light emitting element 23 abut against the facing surface 15r. However, a step need not be formed, and the light emitting element 23 need not abut against the facing surface 15r.

Figure 7:
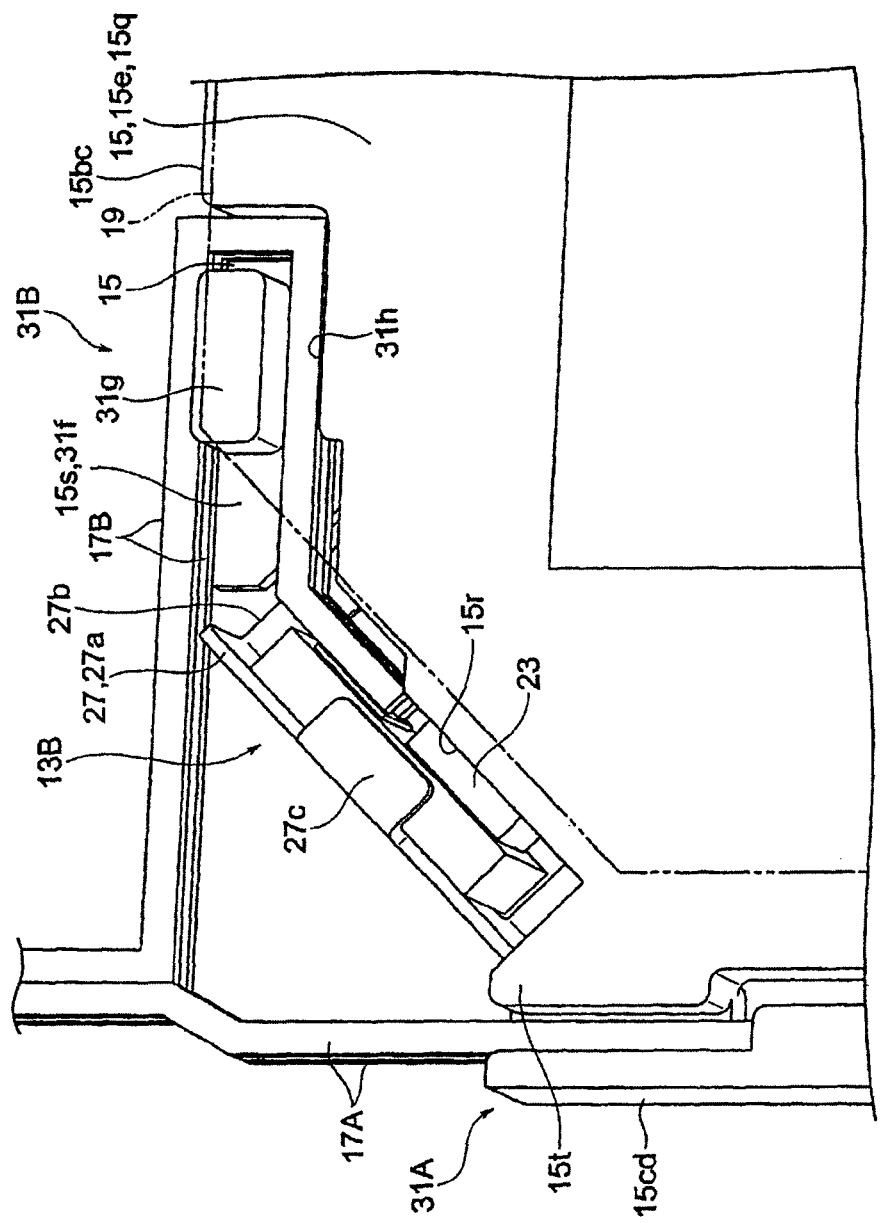
FIG. 7 A perspective view which shows the periphery of another light source unit.

FIG. 7 is a perspective view which shows the periphery of the second light source 13B.

On the second light source unit 13B side as well, in the same way as the first light source unit 13A side, a stopper 15s and positioning portion 15t are provided. The configurations of the stopper 15s and positioning portion 15t on the second light source unit 15B side are the same as those of the stopper 15s and positioning portion 15t on the first light source unit 13A side explained above.

Figure 8:
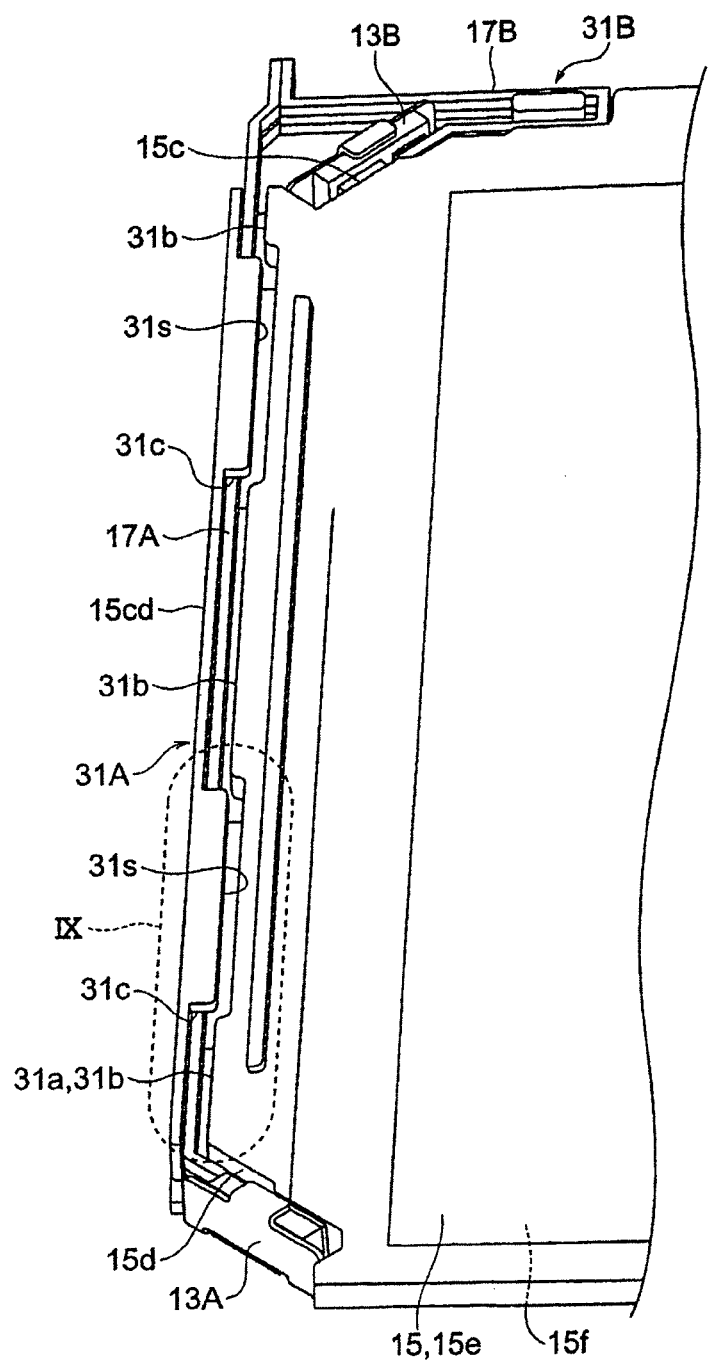
FIG. 8 A perspective view which shows enlarged the vicinity of wiring of a light guide plate of the light source device of FIG. 4.

FIG. 8 is a perspective view which shows enlarged the vicinity of the wirings 17 of the light guide plate 15.

The light guide plate 15 has a first guide part 31A for positioning the first wiring 17A and a second guide part 31B for positioning the second wiring 17B. The guide parts 31 are formed integrally with the other parts of the light guide plate 15 for example by forming shapes corresponding to the guide parts 31 in the mold for injection molding the light guide plate 15.

Figure 9:
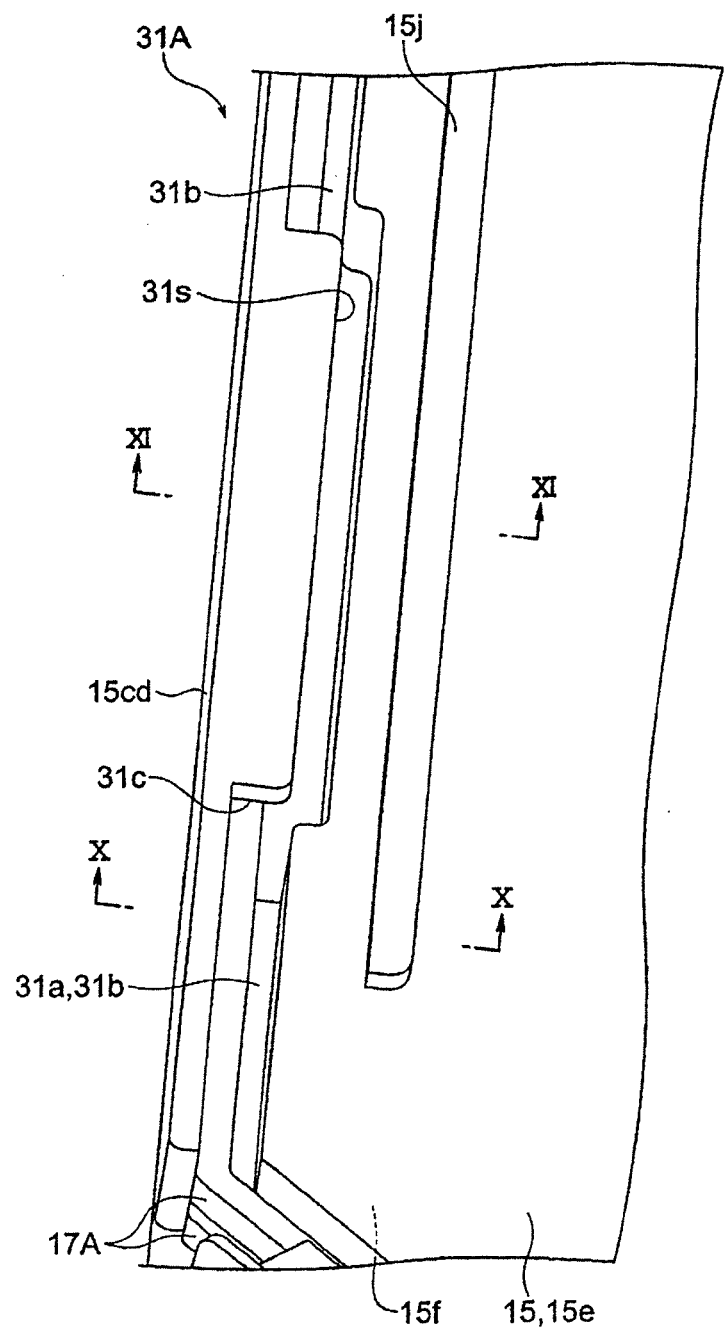
FIG. 9 A perspective view which shows enlarged a region IX of FIG. 8.

FIG. 9 is a perspective view which shows enlarged a region IX of FIG. 8.

As shown in FIG. 8 and FIG. 9, the first guide part 31A is provided along the third side surface 15cd of the light guide plate 15 (it is also possible to grasp that the first guide part 31A configures the third side surface 15cd) and guides the first wiring 17A along the third side surface 15cd.

More specifically, the first guide part 31A has a groove portion 31a which extends along the third side surface 15cd. The first wiring 17A is guided by being accommodated in the groove portion 31a.

The groove portion 31a has first concave grooves 31b which are formed in the first major surface 15e of the light guide plate 15 and second concave grooves 31c which are formed in the second major surface 15f. The first concave grooves 31b and the second concave grooves 31c are alternately provided in a direction along the third side surface 15cd (the arrangement direction of the first wiring 17A) and connected.

More specifically, from the first light source unit 13A side to the second light source 13B side, a first concave groove 31b, second concave groove 31c, first concave groove 31b, second concave groove 31c, and first concave groove 31b are provided in that order. These first concave grooves 31b and second concave grooves 31c are for example arranged substantially symmetrically about the center of the third side surface 15cd. For example, a first concave groove 31b is located at the center of the third side surface 15cd, second concave grooves 31c are located on the two sides of that at positions and with lengths which are roughly equal, and, further, first concave grooves 31b are located on their two sides.

In the first guide part 31A, a slit 31s is formed which penetrates from the first major surface 15e to the second major surface 15f. The slit 31s is formed with a width that allows the first wirings 17A (at least one of them) to pass therethrough, connects with the first concave grooves 31b, and runs parallel to the second concave grooves 31c. The portion of the slit 31s which runs parallel to the second concave grooves 31c is located inside the major surface of the light guide plate 15 from the second concave grooves 31c.

Note that, in the present embodiment, the portions of the slit 31s which run parallel to the second concave grooves 31c open to the bottom of the second concave grooves 31c. The width capable of passing the first wiring 17A does not always have to be larger than the diameter of the first wiring 17A, but may be a width capable of passing the first wiring 17A while resiliently deforming its coating film.

At first, the first wiring 17A is accommodated in the first concave grooves 31b and is passed through the slit 31s from the first major surface 15e side. Then, the first wiring 17A is positioned by the first concave grooves 31b and second concave grooves 31c by the portions which have passed through the slit 31s being moved to the outside of the major surface of the light guide plate 15.

Figure 10:
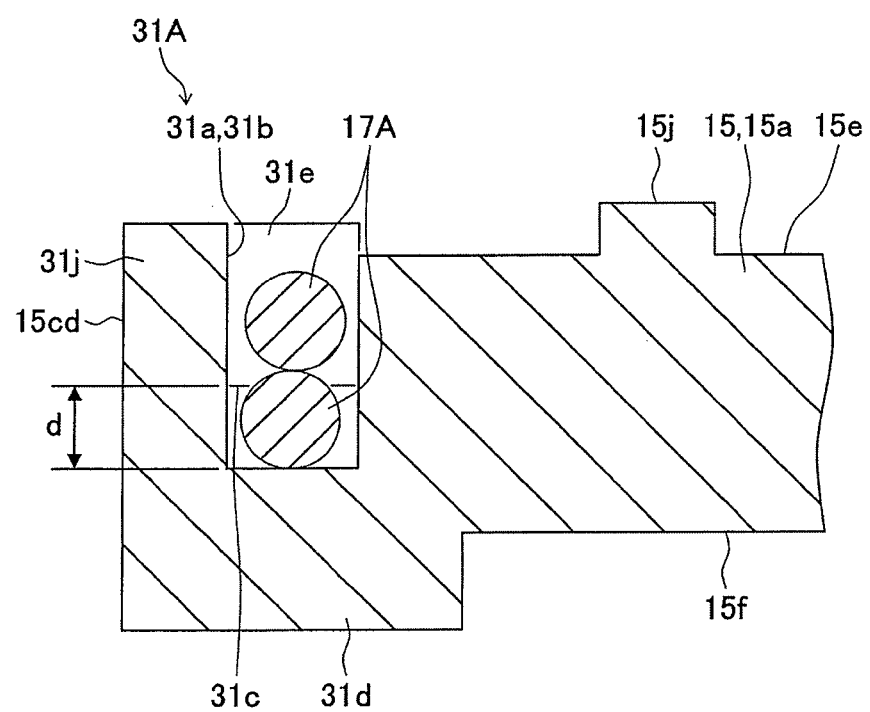
FIG. 10 A cross-sectional view taken along the line X-X of FIG. 9.
Figure 11:
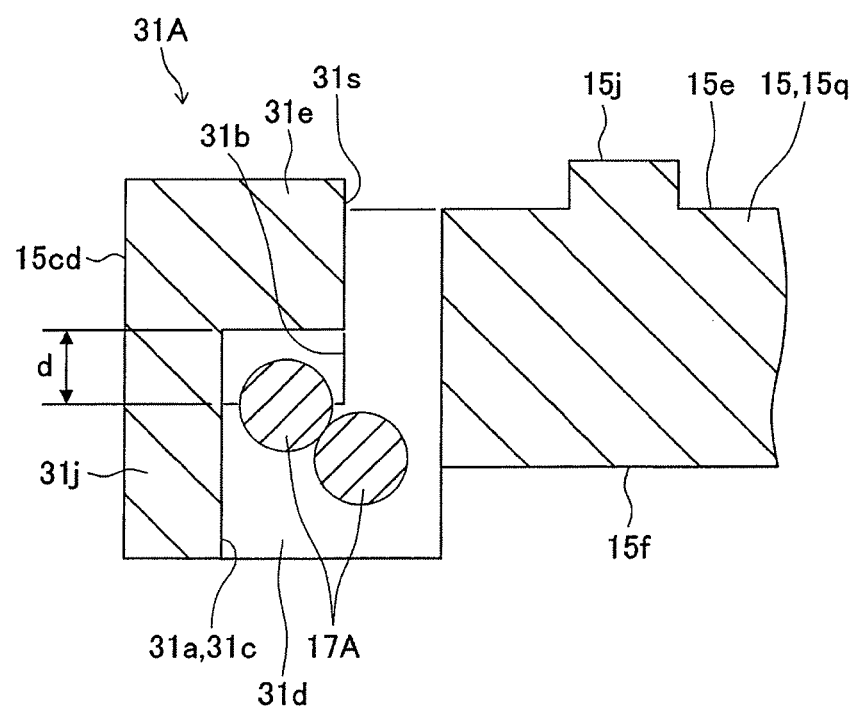
FIG. 11 A cross-sectional view taken along the line XI-XI of FIG. 9.

FIG. 10 is a cross-sectional view taken along the line X-X of FIG. 9. FIG. 11 is a cross-sectional view taken along the line XI-XI of FIG. 9.

The first concave grooves 31b and second concave grooves 31c which were explained above can be grasped from another viewpoint. That is, it can be grasped that the first guide part 31A has first locking portions 31d which can abut against the first wiring 17A from one lateral side (the second major surface 15f side) and second locking portions 31e which can abut against the first wiring 17A from the other lateral side (first major surface 15e side). Further, the first locking portions 31d and the second locking portions 31e are alternately arranged in the extending direction of the first wiring 17A. Further, the first guide part 31A has third locking portions 31j and a light guide plate body 15q which are arranged over the arrangement positions of the first locking portions 31d and second locking portions 31e and abut against the first wiring 17A in the direction perpendicular to the abutment direction of the first locking portions 31d and the second locking portions 31e.

Viewed in the extending direction of the first wiring 17A, a gap "d" between a first locking portion 31d and a second locking portion 31e (gap between the bottom surface of the first concave groove 31b and the bottom surface of the second concave groove 31c) is narrower than the diameter of one first wiring 17A. Accordingly, the first wiring 17A is positioned by the first locking portion 31d and second locking portion 31e so as to meander somewhat.

Note that, a projecting ridge 15j which is located at the inner side of the major surface of the light guide plate 15 from the first guide part 31A (see FIG. 9 too) is for positioning the optical sheet 19 by abutment against an edge of the optical sheet 19. Note the projecting ridge 15j may be arranged at another position and be broadened to a position where it closes the first concave groove 31b and slit 31s as well.

FIG. 7 which has been already referred to is also a perspective view which shows the second guide part 31B enlarged.

The second guide part 31b has a thin portion 31f in which the surface on the first major surface 15e side becomes lower than the light guide plate body 15q and a projection portion 31g which projects from the thin portion 31f to the direction faced by the first major surface 15e.

The projection portion 31g is mostly located in the direction along the second side surface 15bc with respect to the second light source unit 13B. The planar shape of the projection portion 31g may be suitably set, but is for example a roughly rectangular shape having a direction along the second side surface 15bc as the longitudinal direction.

Further, the second wiring 17B extends, on the thin portion 31f, from the second light source unit 13B side to the projection portion 31g side along the second side surface 15bc. After that, it circles around the projection portion 31g at a predetermined angle (180 degrees in the present embodiment). The second wiring 17B is turned back and positioned by circling around the projection portion 31g. The turned second wiring 17B extends along the second side surface 15bc again, but from the projection portion 31g side to the second light source unit 13B side this time.

Between the projection portion 31g and the light guide plate body 15q, a third concave groove 31h is formed along a portion of the outer periphery of the projection portion 31g. Note that, a portion of the third concave groove 31h extends along the second side surface 15bc, while another portion is perpendicular to the second side surface 15bc. The third concave groove 31h positions the second wiring 17B by accommodating the second wiring 17B. The third concave groove 31h is closed by the optical sheet 19 (indicated by the two-dotted chain line).

Note that, the thin portion 31f for arranging the second wiring 17b is connected to or shared with the stopper 15s on the second light source unit 13B side. The two ends of the first guide part 31A are connected to or shared with the stopper 15s (FIG. 6) on the first light source unit 13A side and the positioning portion 15t (FIG. 7) on the second light source unit 13B side.

According to the above embodiment, from a first viewpoint, the light source device 11 has the light emitting element 23, the light guide plate 15 which the light from the light emitting element 23 enters, and wirings 17 which supply power to the light emitting element 23, while the light guide plate 15 has the guide parts 31 for positioning the wirings 17.

Accordingly, the wirings 17 are positioned with respect to the light guide plate 15. As a result, for example, the drop in work efficiency due to free movement of the wirings 17 with respect to the light guide plate 15 is suppressed. Further, for example, the wirings 17 are kept from being caught between unintended members and given stress. That is, the wirings 17 are suitably arranged with respect to the light guide plate 15. The guide parts 31 are provided on the light guide plate 15, therefore the number of members does not increase either.

The first guide part 31A includes a groove portion 31a which extends along the edge of the light guide plate 15 and accommodates the first wiring 17A.

Accordingly, the first guide part 31A can arrange the first wiring 17A at the outer circumferential side of the light guide plate 15 to reduce the influence of the first wiring 17A upon the luminance etc. while accommodating the first wiring 17A and keeping the first wiring 17A from being caught between the light guide plate 15 and another member (for example, the housing 3) and thereby protect the first wiring 17A. Further, since the first wiring 17A is kept from being caught between the light guide plate 15 and the housing 3, the work of fitting the light source device 11 in the back board 7 is facilitated as well.

The first guide part 31A has a first locking portion 31d which can abut against the first wiring 17A from one lateral side and a second locking portion 31e which can abut against the first wiring 17A from another lateral side.

Accordingly, the first wiring 17A can be reliably positioned in the two directions of one lateral side and another lateral side.

First locking portions 31d and second locking portions 31e are alternately arranged in the extending direction of the first wiring 17A.

Accordingly, compared with the case where a first locking portion 31d and a second locking portion 31e face each other while sandwiching the first wiring 17A therebetween, positioning in two ways as explained above can be carried out while suppressing application of excessive load (compressive load) to the first wiring 17A, and error or design change relating to the diameter of the first wiring 17A can be flexibly coped with.

When viewed in the extending direction of the first wiring 17A, the gap "d" between a first locking portion 31d and a second locking portion 31e is narrower than the diameter (width of cross-section) of the first wiring 17A.

Accordingly, bidirectional positioning of the first wiring 17A can be reliably carried out by utilizing the resistance against bending of the first wiring 17A while avoiding excessive compressive load as explained above. Further, the first wiring 17A more reliably abuts against the first locking portion 31d and second locking portion 31e, therefore an increase of frictional resistance of the first wiring 17A against the tension is expected as well.

The first guide part 31A has the first concave grooves 31b which are formed in one major surface (first major surface 15e) of the light guide plate 15 and accommodate the first wiring 17A and the second concave grooves 31c which are formed in the other major surface (second major surface 15f) of the light guide plate 15 and accommodate the first wiring 17A.

Accordingly, this means positioning of the first wiring 17A is performed in all directions of the diameter direction, so free movement of the first wiring 17A is more reliably suppressed.

The first concave grooves 31b and second concave grooves 31c are alternately arranged and connected in the extending direction of the first wiring 17A.

Accordingly, in the same way as the effect by the alternate arrangement of first locking portions 31d and second locking portions 31e, it is possible to suppression application of excessive load (compressive load) by the bottom surfaces of the first concave grooves 31b and the bottom surfaces of the second concave grooves 31c while positioning by these bottom surfaces. Further, error or design changes relating to the diameter of the first wiring 17A can be flexibly coped with as well.

In the light guide plate 15, the slit 31s is formed with a width capable of passing the first wiring 17A therethrough, penetrates from the first major surface 15e to the second major surface 15f, and extends while connected with the first concave grooves 31b and runs parallel to the second concave grooves 31c.

Accordingly, as already explained, the first wiring 17A is not moved in its extending direction to insert it in the first concave grooves 31b and second concave grooves 31c.

Rather, the first wiring 17A can be moved in its diametrical direction to accommodate it in the first concave grooves 31b and second concave grooves 31c. That is, the first wiring 17A can be simply arranged in the first concave grooves 31b and second concave grooves 31c.

The light source units 13 are individually provided at the third corner 15c and at the fourth corner 15d on the two ends of one side of the edge of the light guide plate 15 (the third side surface 15cd). The first concave grooves 31b and second concave grooves 31c guide the first wiring 17A which extends from the first light source unit 13A side to the second light source unit 13B side along the third side surface 15cd and which supplies power to the first light source unit 13A. The slit 31s is located inside the major surface of the light guide plate 15 from the second concave grooves 31c. In the direction along the third side surface 15cd, a first concave groove 31b is located at the center, and second concave grooves 31c and the slit 31s are provided on the two sides thereof.

Accordingly, compared with the combination of the second concave grooves 31c and slit 31s, a first concave groove 31b having a low liability of relatively lowering the luminance of the display region 9c is arranged at the farthest position from the two light source units 13. As a result, suppression of a local drop of the luminance is expected. Further, by the second concave grooves 31c and the slit 31s which are arranged on the two sides of the first concave groove 31b, equalization of the luminance at the two sides of the first concave groove 31b and reliable positioning of the first wiring 17A at the two light source units 13 are expected.

The second guide part 31B has a projection portion 31g which changes the direction of the second wiring 17B by the second wiring 17B circling around it.

Accordingly, positioning simply changing the direction of extension of the second wiring 17B becomes possible. Further, when tension is applied to the second wiring 17B, part or all of the tension is cancelled by the frictional resistance of the projection portion 31g and transmission of the tension up to the tip is suppressed. As a result, for example, the connection portion of the second wiring 17B and the second light source unit 13B can be protected.

The second wiring 17B extends along the edge of the light guide plate 15 (second side surface 15bd), circles the projection portion 31h, and extends again along the edge.

Accordingly, by the second wiring 17B circling so as to turn back, the effect of suppressing transmission of tension described above is reliably obtained. Further, since such turn back is performed along the edge of the light guide plate 15, it is possible to arrange the second wiring 17B on the outer circumferential side of the light guide plate 15 to reduce the influence which is exerted upon the luminance while securing space for the second wiring 17B to turn back.

The guide parts 31 are arranged in the non-irradiation region of the light emitting element 23 (the portion on the third side surface 15cd side etc.)

Accordingly, the influence of the guide parts 31 or the wirings 17 positioned by the guide parts 31 upon the luminance is reduced. Further, in the light guide plate 15, the non-irradiation region of the light emitting element 23 is the region which becomes "dead space" since the influence exerted upon the improvement of luminance of the display region 9c is low and effective utilization of such a region is achieved.

The light source device 11 further has the optical sheet 19 which is laminated on the first major surface 15e of the light guide plate 15 and transmits the light from the light guide plate 15 therethrough. The second guide part 31B includes a third concave groove 31h which is provided in the first major surface 15e and which accommodates the second wiring 17b. The optical sheet 19 closes the third concave groove 31h.

Accordingly, the optical sheet 19 is also used as the member suppressing detachment of the second wiring 17B from the third concave groove 31h. That is, the second wiring 17B can be more reliably positioned while decreasing the number of the members.

The display device 1 has the light emitting element 23, the light guide plate 15 which the light from the light emitting element 23 enters, the display panel 9 to which the light guided by the light guide plate 15 is irradiated, and the wirings 17 supplying power to the light emitting element 23. The light guide plate 15 has the guide parts 31 for positioning the wirings 17. Accordingly, in the display device 1 as well, the advantageous effect of the light source device 11 of the first aspect is exhibited.

The display panel 9 is a liquid crystal display panel. The display region 9c of the liquid crystal display panel is provided offset with respect to the major surface of the light guide plate 15. The guide parts 31 are formed along the edge among the edges of the light guide plate 15 which have a large distance from the display region 9c (the second side surface 15bc or third side surface 15cd).

Accordingly, the influence of the guide parts 31 or the wirings 17 positioned by the guide parts 31 exerted upon the luminance of the display region 9c is reduced. Further, in the light guide plate 15, the region having a large distance from the display region 9c is the region which becomes "dead space" since the influence exerted upon the improvement of luminance of the display region 9c is low and effective utilization of such region is achieved.

Further, according to the above embodiment, from a second viewpoint, the light source device 11 has the light emitting element 23, the light guide plate 15 which the light from the light emitting element 23 enters, and wirings 17 which extend from the light emitting element 23 side along the edge of the light guide plate 15 (the second side surface 15bc or third side surface 15cd) and which supply power to the light emitting element 23. The light guide plate 15 has a stopper 15s which is located on the wiring 17 arrangement side with respect to the light emitting element 23 and restricts the movement of the light emitting element 23 to the arrangement side of the wirings 17.

Accordingly, even when tension is applied to the wirings 17, positional deviation of the light emitting element 23 with respect to the light guide plate 15 can be suppressed. As a result, a drop of the luminance or a drop of the uniformity of luminance in the light guide plate 15 is suppressed. Further, the stopper 15s is formed at the light guide plate 15, therefore an increase of the number of the members does not occur, and utilization of the light which leaks sideward from the light emitting element 23 and is reflected by the stopper 15s is expected as well.

The light guide plate 15 has the positioning portion 15t which is located on the opposite side to the arrangement side of the wiring 17 from the light emitting element 23 and restricts movement of the light emitting element 23 to the opposite side.

Accordingly, the positional deviation of the light emitting element 23 is more reliably suppressed. Further, the positioning portion 15t is formed at the light guide plate 15 in the same way as the stopper 15s, therefore an increase of the number of the members does not occur, and utilization of the light which leaks sideward from the light emitting element 23 and is reflected or the like is expected as well.

The light guide plate 15 has the projection portion 31g around which the second wiring 17B is circles so that the second wiring 17B extending from the light emitting element 23 side of the second light source unit 13B turns back to the light emitting element 23 side.

Accordingly, even if tension is applied to the end on the outer side of the second wiring 17B, transmission of the tension to the light emitting element 23 is suppressed by the frictional resistance received from the projection portion 31g, the positional deviation of the light emitting element 23 is further suppressed. Further, such a projection portion 31g is formed on the light guide plate 15, therefore an increase of the number of the members does not occur either.

The light source device 11 further has the optical sheet 19 which is laminated on the first major surface 15e of the light guide plate 15 and transmits the light from the light guide plate 15 therethrough. In the light guide plate 15, the third concave groove 31h for accommodating the second wiring 17B is formed in the first major surface 15e. The projection portion 31g is configured in the partial region by extension of the third concave groove 31h so as to separate the partial region of the first major surface 15e from the other regions. The optical sheet 19 closes the third concave groove 31h.

Accordingly, the optical sheet 19 is used also as the member suppressing detachment of engagement of the second wiring 17B with respect to the projection portion 31g. That is, the transmission of the tension of the second wiring 17B can be more reliably suppressed while decreasing the number of the members.

The light source device 11 further has a substrate 25 on which the light emitting element 23 and wirings 17 are mounted and a heat dissipating plate 27 which holds the substrate 25. The stopper 15s abuts against the heat dissipating plate 27 and restricts the movement of the light emitting element 23.

Accordingly, compared with the case where a stopper capable of abutting against a very small light emitting element 23 while avoiding the substrate 25 and heat dissipating plate 27 is formed (this case is included in the invention of the present application as well), the configuration of the stopper 15s can be made simple. Further, micro machining is unnecessary.

The heat dissipating plate 27 has an extending portion 27b which is located on one side of the direction faced by the light guide plate 15 further than the light guide plate 15 and extends parallel to the light guide plate 15. In the extending portion 27b, a hole 27h accommodating at least a portion of the substrate 25 is formed.

Accordingly, the extending portion 27b for increasing the heat dissipation area can be used to position the substrate 25 with respect to the heat dissipating plate 27, and a reduction of size of the light source unit 13 (reduction of thickness of the light source device 11) by the amount of overlap of the extending portion 27b and the substrate 25 is achieved. It also becomes possible to make the substrate 25 directly abut against the housing 3 etc. to dissipate heat.

The display device 1 has the light emitting element 23, the light guide plate 15 which the light from the light emitting element 23 enters, the display panel 9 to which the light of the light guide plate 15 is irradiated, and the wirings 17 which extend from the light emitting element 23 side along the edge of the light guide plate 15 (second side surface 15bc or third side surface 15cd) and which supply power to the light emitting element 23. The light guide plate 15 has the stopper 15s which is located on the arrangement side of the wirings 17 from the light emitting element 23 and which restricts the movement of the light emitting element 23 to the arrangement side of the wirings 17. Accordingly, in the display device 1 as well, the effect of the light source device 11 of the second viewpoint explained above is exhibited.

The present invention is not limited to the above embodiment and may be executed in various ways.

The display device is not limited to a liquid crystal display device. For example, the display device may be one which has a film which is illuminated by a light source device (device in which the image does not change) as well. Further, for example, the display device may be an organic EL display device as well (the display panel may be an organic EL panel as well). The organic EL panel is a self-light emitting type, therefore a backlight etc. (a light source device including a light guide plate) is unnecessary in the image display itself. However, by illuminating the organic EL panel, the overall visibility can be improved. Note that, in the case where the display panel is an organic EL panel, the display region thereof may be provided offset with respect to the major surface of the light guide plate and the guide parts may be formed along the edge having a large distance from the display region among the edges of the light guide plate in the same way as the case where the display panel is a liquid crystal panel. Further, the display device may be one configuring a touch panel as well.

The number of light sources is not limited to two. One or three or more light sources may be provided as well. Further, the light source is not limited to one arranged at the corner of the light guide plate. For example, the light source may be provided at the center of one side of the light guide plate as well. The light source is not limited to an LED and may for example be a cold cathode tube.

The wirings and guide parts for positioning the wirings may be arranged not only in the non-irradiation region of a light source or a region which has a relatively large distance from the display region, but also in the irradiation region or a region which has a relatively short distance from the display region. Note that, by arranging light sources at four corners of the light guide plate, etc., there need not be a non-irradiation region. By arranging the display region at the center of the light guide plate, there need not be a region having a relatively large distance from the display region.

The guide part is not limited to one having a groove portion capable of accommodating the wiring. For example, the guide part may be one positioning the wiring by a plurality of pins which are arranged along the extending direction of the wiring.

The groove portion configuring the guide part is not limited to a concave groove and may be a groove with a hole as well. Further, the groove portion is not limited to one provided in the major surface of the light guide plate and may be one provided in a side surface of the light guide plate.

The first locking portions and second locking portions (31d, 31e) which are alternately arranged in the extending direction of the wirings are not limited to those abutting against the side surfaces of the wirings in the direction faced by the major surface of the light guide plate and may be those abutting against the side surfaces of the wirings in the direction along the major surface of the light guide plate.

Further, the first locking portions and second locking portions do not have to configure the first concave grooves (31b) and second concave grooves (31c). For example, in the embodiment, the third locking portions 31j (FIG. 10 and FIG. 11) may be omitted as well. Note that, in this case, the wirings can be locked by the first locking portions 31d and second locking portions 31e from the lateral side of the light guide plate 15, therefore the slit 31s is unnecessary.

Further, in the case where the first concave grooves and second concave grooves are formed, a locking portion for suppressing detachment of the wirings 17 from these concave grooves may further be provided as well. For example, in FIG. 10, a locking portion which projects from the end of a third locking portion 31j on the upper side in the sheet surface to the inside of the first major surface 15e and closes a portion of the lateral side of a first concave groove 31b may be provided as well. Further, for example, in FIG. 11, a locking portion which projects from the end of a second locking portion 31e on the slit 31s side to the second major surface 15f side may be provided as well.

Further, the gap (d) between a first locking portion and a second locking portion seen in the extending direction of the wiring may be broader than the diameter of the wiring as well. Even in this case, the effect of positioning on one lateral side and the other side of the wiring is obtained.

The number of the first locking portions and second locking portions (first concave grooves and second concave grooves) is not limited to five in total. For example, it may be two in total (one first locking portion and one second locking portion). Note, it is preferred from the viewpoint of obtaining a sufficient positioning effect that there be three or more first locking portions and second locking portions in total.

The projection portion (31g) around which the wiring is circled is not limited to one which makes the wiring turn back. For example, it may be one changing the direction of the wiring by about 90 degrees as well. Further, the case where the wiring turns back is not limited to the case where the orientation of the wiring changes by 180 degrees and may include a case where the orientation of the wiring changes by 135 degrees to 225 degrees or changes by 150 degrees to 210 degrees. Further, the wiring may be wound around the projection portion by one lap or more.

Further, the projection portion around which the wiring is circled is not limited to one projecting to the direction faced by the major surface of the light guide plate. For example, the projection portion may be one projecting to the direction faced by a side surface of the light guide plate as well. Further, the shape of the projection portion is not limited to a rectangular parallelepiped shape. For example, the projection portion may be a cylindrical shape or may be a tapered shape with a diameter which expands toward the tip end side.

The optical sheet and reflecting plate (or reflecting sheet) may be omitted, the other members may be used instead of them, or portions exhibiting these functions may be formed integrally with the light guide plate.

The substrate on which the light emitting element is mounted and the heat dissipating plate which holds the substrate may be omitted as well. That is, the light emitting element may be positioned directly with respect to the light guide plate. The empty space of the heat dissipating plate is not limited to a hole and may be a cut-away portion or concave portion.

REFERENCE SIGNS LIST

1 . . . display device, 11 . . . light source device, 13 . . . light source unit (light source), 15 . . . light guide plate, 17 . . . wiring, 23 . . . light emitting element (light source), 31 . . . guide part, and 15s . . . stopper.

The invention claimed is:

1. A light source device comprising:
a light source,
a light guide plate facing the light source, and
a wiring, extending in a direction, which is coupled to the light source, the wiring comprising a first side, and a second side opposed to the first side, wherein
the light guide plate comprises a guide part which positions the wiring, the guide part comprising a first portion supporting the first side and a second portion supporting the second side, whereby the first portion and the second portion are alternately arranged in the direction.

2. The light source device as set forth in claim 1, wherein:
the guide part comprises a groove portion which extends along an edge of the light guide plate, and accommodates the wiring.

3. The light source device as set forth in claim 1, wherein:
a gap between the first portion and the second portion is narrower than a diameter of the wiring in a view of the direction.

4. The light source device as set forth in claim 1, wherein:
the guide part is arranged in a non-irradiation region of the light source.

5. The light source device as set forth in claim 1, further comprising:
an optical sheet located on a first surface of the light guide plate, wherein
the guide part comprises a concave groove formed in the first surface and accommodates the wiring, and
the concave groove is covered with the optical sheet.

6. A display device comprising:
the light source device according to claim 1, and
a display panel located on the light source device.

7. The display device as set forth in claim 6, wherein:
the display panel is a liquid crystal panel or organic EL panel,
a display region of the liquid crystal panel is provided offset with respect to a surface of the light guide plate, and
the guide part is formed along an edge having a large distance from the display region among the edges of the light guide plate.

8. A light source device comprising:
a light source,
a light guide plate which light from the light source enters, and
wiring for supplying power to the light source, wherein
the light guide plate has a guide part for positioning the wiring wherein:
the guide part comprises
a first concave groove which is formed in a first surface of the light guide plate and accommodates the wiring and
a second concave groove which is formed in a second surface of the light guide plate and accommodates the wiring.

9. The light source device as set forth in claim 8, wherein:
the wiring extends in a direction, and
the first concave groove and the second concave groove are arranged in the direction and alternately are connected to each other.

10. The light source device as set forth in claim 9, wherein:
the light guide plate is formed with a slit which has a width capable of passing the wiring therethrough, penetrates from the first surface to the second surface, and extends while connected to the first concave groove and runs parallel to the second groove.

11. The light source device as set forth in claim 10, wherein:
the light source is located each of corners of two ends of the edge of the light guide plate,
the first concave groove and the second concave groove guide a wiring which extends from above one light source side to above other light source side along the one side and which supplies power to the one light source,
the slit is arranged inside the major surface of the light guide plate from the second concave groove, and,
in the direction along the one side, the first concave groove is located at a center, and the second concave groove and the slit are provided at each of the two sides thereof.

12. A display device comprising:
the light source device according to claim 8, and
a display panel located on the light source device.

13. A light source device comprising:
a light source,
a light guide plate which light from facing the light source enters, and
a wiring for supplying power to the light source, wherein
the light guide plate comprises a guide part for positioning the wiring, wherein:
the guide part has a projection portion for changing the direction of the wiring by making the wiring circle it.

14. The light source device as set forth in claim 13, wherein:
the wiring extends along the edge of the light guide plate, circles the projection portion to turn back, and extends again along the edge.

15. A display device comprising:
the light source device according to claim 13, and
a display panel located on the light source device.

* * * * *